United States Patent
Deng et al.

(10) Patent No.: US 12,464,441 B2
(45) Date of Patent: Nov. 4, 2025

(54) METHOD AND APPARATUS FOR TERMINAL TO ACCESS NETWORK, INTERNET OF THINGS SYSTEM, AND COMPUTER PROGRAM PRODUCT

(71) Applicant: BOE Technology Group Co., Ltd., Beijing (CN)

(72) Inventors: Wei Deng, Beijing (CN); Yi Bian, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 362 days.

(21) Appl. No.: 17/921,066

(22) PCT Filed: Jun. 8, 2021

(86) PCT No.: PCT/CN2021/098927
§ 371 (c)(1),
(2) Date: Oct. 24, 2022

(87) PCT Pub. No.: WO2022/012223
PCT Pub. Date: Jan. 20, 2022

(65) Prior Publication Data
US 2023/0180109 A1    Jun. 8, 2023

(30) Foreign Application Priority Data

Jul. 14, 2020 (CN) .......................... 202010674426.0

(51) Int. Cl.
*H04W 48/16* (2009.01)
*H04W 48/10* (2009.01)
*H04W 52/02* (2009.01)

(52) U.S. Cl.
CPC ........... *H04W 48/16* (2013.01); *H04W 48/10* (2013.01); *H04W 52/0216* (2013.01)

(58) Field of Classification Search
CPC ................. H04W 48/16; H04W 48/10; H04W 52/0216; H04W 52/0229; H04W 52/02;
(Continued)

(56) References Cited

U.S. PATENT DOCUMENTS

2005/0041673 A1* 2/2005 Jiang ................... H04L 47/2433
370/401
2008/0214249 A1* 9/2008 Kim ..................... H04B 1/1615
455/574
(Continued)

FOREIGN PATENT DOCUMENTS

CN          103428815 A      12/2013
CN          104811988 A       7/2015
(Continued)

OTHER PUBLICATIONS

CN202010674426.0 first office action.
CN202010674426.0 second office action.
PCT/CN2021/098927 international search report.

*Primary Examiner* — Dhaval V Patel
(74) *Attorney, Agent, or Firm* — IPro, PLLC

(57) ABSTRACT

Provided in the present disclosure are a method and apparatus for a terminal to access a network, an Internet of Things (IoT) system, and a computer program product. The method includes: receiving idle timeslot information of a gateway to be accessed that is sent by said gateway in a current timeslot; parsing the number of timeslots between the current timeslot and a latest idle timeslot from the idle timeslot information; determining the sleep duration of a terminal according to the number of timeslots; and sending a network access request to said gateway after sleeping until the latest idle timeslot according to the sleep duration.

18 Claims, 5 Drawing Sheets

(58) Field of Classification Search
CPC .......... H04W 52/0212; H04W 52/0248; Y02D 30/70
See application file for complete search history.

(56) References Cited

U.S. PATENT DOCUMENTS

| | | |
|---|---|---|
| 2011/0314145 A1 | 12/2011 | Raleigh et al. |
| 2015/0146598 A1* | 5/2015 | Cheong ............. H04W 52/0209 370/311 |
| 2016/0037449 A1 | 2/2016 | Kandhalu Raghu et al. |
| 2017/0280390 A1* | 9/2017 | Wu ................... H04W 52/0248 |
| 2024/0031932 A1* | 1/2024 | Zhang ............... H04W 52/0225 |

FOREIGN PATENT DOCUMENTS

| | | | | |
|---|---|---|---|---|
| CN | 105323835 A | | 2/2016 | |
| CN | 105376834 A | * | 3/2016 | ............ H04W 24/08 |
| CN | 105575092 A | * | 5/2016 | ............ H04W 24/08 |
| CN | 105611595 A | | 5/2016 | |
| CN | 107222872 A | | 9/2017 | |
| CN | 108307420 A | * | 7/2018 | ............ H04W 24/08 |
| CN | 110784909 A | | 2/2020 | |
| CN | 111328081 A | | 6/2020 | |

* cited by examiner

METHOD AND APPARATUS FOR TERMINAL TO ACCESS NETWORK, INTERNET OF THINGS SYSTEM, AND COMPUTER PROGRAM PRODUCT

CROSS REFERENCE TO RELATED APPLICATION

The present disclosure is a National Stage of International Application No. PCT/CN2021/098927, filed on Jun. 8, 2021, which claims the priority to Chinese Patent Application No. 202010674426.0, filed to the Chinese Patent Office on Jul. 14, 2020 and entitled "METHOD AND APPARATUS FOR TERMINAL TO ACCESS NETWORK, AND INTERNET OF THINGS SYSTEM", both of which are incorporated in their entireties herein by reference.

FIELD

The present disclosure relates to the technical field of communication, and in particular to a method and apparatus for a terminal to access a network, an Internet of Things system, and a computer program product.

BACKGROUND

As a significant transfer station in the Internet of Things system, the gateway is mainly configured for information exchange between the terminal and the server. Generally, the terminal accesses the Internet of Things system through the gateway. In addition, the communication protocol between the gateway and the terminal will have a great impact on the function, timely response, power consumption, etc. of the system. The terminal is required to scan the signal sent by the gateway and to wait for the idle timeslot of the gateway to access the network. Owing to numerous terminals carried by the gateway and few idle timeslots, the terminal will keep scanning the gateway until the idle timeslot is scanned, so as to access the network. Especially when the gateway has carried a maximum number of terminals, if the gateway has no idle timeslot, the terminal determines that it cannot access the network only after the entire scanning period.

SUMMARY

The present disclosure provides a method and apparatus for a terminal to access a network, an Internet of Things system, and a computer program product. A specific solution is as follows.

Provided in an embodiment of the present disclosure is a method for a terminal to access a network. The method is applied to a terminal and includes: receiving an idle timeslot information, sent by a gateway to be accessed in a current timeslot, of the gateway to be accessed; parsing the number of timeslots between the current timeslot and a latest idle timeslot from the idle timeslot information; determining a dormancy duration of the terminal according to the number of timeslots; and sending a network access request to the gateway to be accessed after the terminal is dormant until the latest idle timeslot according to the dormancy duration.

Optionally, in some embodiments of the present disclosure, the receiving an idle timeslot information, sent by a gateway to be accessed in a current timeslot, of the gateway to be accessed includes: sending a heartbeat real-time clock information of the terminal to the gateway to be accessed; and receiving a heartbeat real-time clock reply information, sent by the gateway to be accessed, of the terminal, the heartbeat real-time clock reply information of the terminal carrying the idle timeslot information.

Optionally, in some embodiments of the present disclosure, the receiving idle timeslot information, sent by a gateway to be accessed in a current timeslot, of the gateway to be accessed includes: receiving a broadcast information sent by the gateway to be accessed, the broadcast information carrying the idle timeslot information.

Optionally, in some embodiments, the determining a dormancy duration of the terminal according to the number of timeslots specifically includes: determining the dormancy duration of the terminal according to a relational expression $t=T(X-1)/N$; where t represents the dormancy duration of the terminal, T represents a total duration of a set protocol period between the terminal and the gateway to be accessed, N represents the total number of timeslots in the set protocol period, and X represents the number of timeslots between the current timeslot and the latest idle timeslot.

Optionally, in some embodiments of the present disclosure, before the receiving an idle timeslot information, sent by a gateway to be accessed in a current timeslot, of the gateway to be accessed, the method further includes: performing scanning to obtain a signal strength information of a plurality of gateways, the plurality of gateways and the terminal being positioned in the same Internet of Things system; and taking, according to the signal strength information, a gateway having the greatest signal strength among the plurality of gateways as the gateway to be accessed.

Optionally, in some embodiments of the present disclosure, the sending a network access request to the gateway to be accessed after the terminal is dormant until the latest idle timeslot according to the dormancy duration includes: monitoring the broadcast information from the gateway to be accessed in the latest idle timeslot and accessing the network.

Optionally, in some embodiments of the present disclosure, the method further includes: in response to determining that the gateway to be accessed has no idle timeslot in the set protocol period with the terminal, selecting a gateway to be accessed from other gateways having idle timeslots among the plurality of gateways excluding the gateway to be accessed after one timeslot duration.

Correspondingly, further provided in an embodiment of the present disclosure is a method for a terminal to access a network. The method is applied to a gateway and includes: determining the number of timeslots between a current timeslot and a latest idle timeslot; adding the number of timeslots into idle timeslot information; sending the idle timeslot information to the terminal; and receiving a network access request from the terminal after the terminal is dormant from the current timeslot to the latest idle timeslot.

Optionally, in some embodiments of the present disclosure, the determining the number of timeslots between a current timeslot and a latest idle timeslot includes: detecting an occupation condition of each timeslot in a set protocol period between the gateway and the terminal through a timeslot mark array; and determining the number of timeslots between the current timeslot and the latest idle timeslot according to the occupation condition.

Optionally, in some embodiments of the present disclosure, the determining the number of timeslots between the current timeslot and the latest idle timeslot according to the occupation condition includes: determining a difference between the latest idle timeslot and the current timeslot as the number of timeslots in response to determining that in the set protocol period, the current timeslot is occupied and the latest idle timeslot is positioned after the current timeslot.

Optionally, in some embodiments of the present disclosure, the determining the number of timeslots between the current timeslot and the latest idle timeslot according to the occupation condition includes: determining the sum of a difference between the latest idle timeslot and the current timeslot and a total number of timeslots in a timeslot period as the number of timeslots in response to determining that in the set protocol period, the current timeslot is occupied and the latest idle timeslot is positioned before a timeslot, corresponding to the current timeslot, in a next set protocol period.

Optionally, in some embodiments of the present disclosure, the determining the number of timeslots between the current timeslot and the latest idle timeslot according to the occupation condition includes: determining the number of timeslots as zero in response to determining that in the set protocol period, the current timeslot is an idle timeslot, which indicates that the latest idle timeslot is the current timeslot.

Correspondingly, further provided in an embodiment of the present disclosure is an Internet of Things system, including a plurality of gateways and a plurality of terminals in communication connection with each gateway through a set protocol; where each terminal is configured to determine a gateway to be accessed from the plurality of gateways; the gateway to be accessed is configured to determine the number of idle timeslots closest to a current timeslot, and send an idle timeslot information including the number of timeslots to each terminal in the Internet of Things system; the terminal is further configured to determine a dormancy duration according to the number of timeslots, and send a network access request to the gateway to be accessed after the terminal is dormant until the latest idle timeslot according to the dormancy duration.

Optionally, in some embodiments of the present disclosure, the gateway to be accessed is configured to receive the network access request from the terminal after the terminal is dormant from the current timeslot to the latest idle timeslot.

Optionally, in some embodiments of the present disclosure, the terminal is configured to monitor a broadcast information from the gateway to be accessed in the latest idle timeslot and accessing the network.

Correspondingly, further provided in an embodiment of the present disclosure is an apparatus for a terminal to access a network. The apparatus includes: a memory and a processor; where the memory is configured to store a computer program; and the processor is configured to execute the computer program in the memory, which includes: receiving an idle timeslot information, sent by a gateway to be accessed in a current timeslot, of the gateway to be accessed; parsing the number of timeslots between the current timeslot and a latest idle timeslot from the idle timeslot information; determining a dormancy duration of the terminal according to the number of timeslots; and sending a network access request to the gateway to be accessed after the terminal is dormant until the latest idle timeslot according to the dormancy duration.

Correspondingly, further provided in an embodiment of the present disclosure is an apparatus for a terminal to access a network. The apparatus is applied to a terminal and includes: a first receiving unit configured for receiving idle timeslot information, sent by a gateway to be accessed in a current timeslot, of the gateway to be accessed; a parsing unit configured to parse the number of timeslots between the current timeslot and a latest idle timeslot from the idle timeslot information; a first determining unit configured to determine a dormancy duration of the terminal according to the number of timeslots; and a first sending unit configured to send a network access request to the gateway after the terminal is dormant until the latest idle timeslot according to the dormancy duration.

Optionally, in some embodiments of the present disclosure, the first receiving unit is configured to: send a heartbeat real-time clock information of the terminal to the gateway to be accessed; and receive a heartbeat real-time clock reply information, sent by the gateway to be accessed, of the terminal, the heartbeat real-time clock reply information of the terminal carrying the idle timeslot information.

Optionally, in some embodiments of the present disclosure, the first receiving unit is configured to: receive a broadcast information sent by the gateway to be accessed, the broadcast information carrying the idle timeslot information.

Optionally, in some embodiments of the present disclosure, the first determining unit is configured to: determine the dormancy duration of the terminal according to a relational expression $t=T(X-1)/N$; where t represents the dormancy duration of the terminal, T represents a total duration of a set protocol period between the terminal and the gateway to be accessed, N represents the total number of timeslots in the set protocol period, and X represents the number of timeslots between the current timeslot and the latest idle timeslot.

Optionally, in some embodiments of the present disclosure, before the first receiving unit receives the idle timeslot information, sent by the gateway to be accessed in the current timeslot, of the gateway to be accessed, the apparatus further includes a scanning unit configured to: perform scanning to obtain a signal strength information of a plurality of gateways, the plurality of gateways and the terminal being positioned in the same Internet of Things system; and take, according to the signal strength information, a gateway having the greatest signal strength among the plurality of gateways as the gateway to be accessed.

Optionally, in some embodiments of the present disclosure, the first sending unit is configured to: monitor a broadcast information from the gateway to be accessed in the latest idle timeslot and accessing the network.

Correspondingly, further provided in an embodiment of the present disclosure is an apparatus for a terminal to access a network. The apparatus is applied to a gateway and includes: a second determining unit configured to determine the number of timeslots between a current timeslot and a latest idle timeslot; a processing unit configured to add the number of timeslots into idle timeslot information; a second sending unit configured to send the idle timeslot information to the terminal; and a second receiving unit configured to receive a network access request from the terminal after the terminal is dormant from the current timeslot to the latest idle timeslot.

Optionally, in some embodiments of the present disclosure, the second determining unit is configured to: detect an occupation condition of each timeslot in a set protocol period between the gateway and the terminal through a timeslot mark array; and determine the number of timeslots between the current timeslot and the latest idle timeslot according to the occupation condition.

Optionally, in some embodiments of the present disclosure, the second determining unit is configured to: determine a difference between the latest idle timeslot and the current timeslot as the number of timeslots in response to determining that in the set protocol period, the current timeslot is occupied and the latest idle timeslot is positioned after the current timeslot.

Optionally, in some embodiments of the present disclosure, the second determining unit is configured to: determine the number of timeslots as zero in response to determining that in the set protocol period, the current timeslot is an idle timeslot, which indicates that the latest idle timeslot is the current timeslot.

Correspondingly, further provided in an embodiment of the present disclosure is a computer program product, enabling a computer to execute the method for a terminal to access a network as described above when running on the computer.

DETAILED DESCRIPTION OF THE EMBODIMENTS

To make the objectives, technical solutions, and advantages in the embodiments of the present disclosure clearer, the technical solutions in the embodiments of the present disclosure will be clearly and completely described below with reference to the accompanying drawings in the embodiments of the present disclosure. It is obvious that the described embodiments are some, rather than all, of the embodiments of the present disclosure. Moreover, the embodiments of the present disclosure and features in the embodiments can be combined with one another without conflict. Based on the described embodiments of the present disclosure, all other embodiments obtained by a person of ordinary skill in the art without inventive efforts fall within the scope of protection of the present disclosure.

Unless defined otherwise, technical or scientific terms used in the present disclosure should be of ordinary meaning as understood by a person of ordinary skill in the art to which the present disclosure pertains. As used in the present disclosure, "comprise", "include", and similar words mean that elements or objects appearing before the word cover elements or objects listed after the word and their equivalents, but do not exclude other elements or objects.

In the related art, if few or even no idle timeslot of a gateway is available, the power consumption is high when a terminal keeps scanning the gateway to access a network.

In view of the above, provided in an embodiment of the present disclosure are a method and apparatus for a terminal to access a network, an Internet of Things system, and a computer program product, which are configured for reducing network access power consumption of the terminal.

Figure 1:
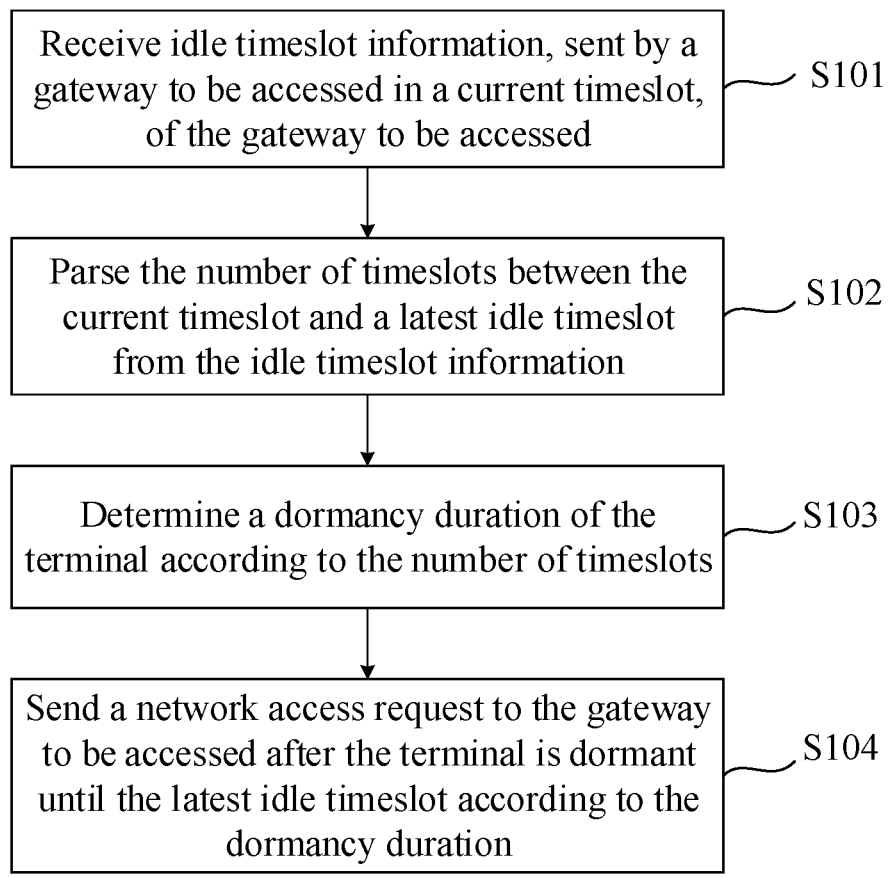
FIG. 1 is a flowchart of a method for a terminal to access a network provided in an embodiment of the present disclosure.

FIG. 1 shows a method for a terminal to access a network provided in an embodiment of the present disclosure. The method is applied to a terminal and includes following steps.

S101: idle timeslot information, sent by a gateway to be accessed in a current timeslot, of the gateway to be accessed is received.

In some embodiments, the gateway to be accessed may be any one of a plurality of gateways in the Internet of Things system, or a gateway screened from a plurality of gateways according to a network access condition, which will not be described in detail herein. In addition, the current timeslot is a corresponding timeslot when the current terminal scans the gateway to be accessed.

S102: the number of timeslots between the current timeslot and a latest idle timeslot is parsed from the idle timeslot information.

S103: a dormancy duration of the terminal is determined according to the number of timeslots.

S104: a network access request is sent to the gateway to be accessed after the terminal is dormant until the latest idle timeslot according to the dormancy duration.

In some embodiments, after being dormant for the dormancy duration from the current timeslot, that is, until the latest idle timeslot, the terminal wakes up and sends the network access request to the gateway to be accessed. In the embodiment of the invention, the dormancy duration may be determined only according to the number of timeslots between the current timeslot and the latest idle timeslot parsed from the received idle timeslot information sent by the gateway to be accessed in the current timeslot. After being dormant until the latest idle timeslot according to the dormancy duration, the terminal sends the network access request to the gateway to be accessed, to access the network. The terminal is not required to keep scanning in an entire process, thereby reducing the network access power consumption of the terminal.

In the related art, if a terminal is in a receiving state from a current timeslot n to a latest idle timeslot m (X+1 timeslots in total), the network access power consumption P1 of the terminal is:

$$P_1 = Ir \times \frac{T}{N} \times (X+1) + Pt$$

where a current generated when the terminal in the receiving state is Ir, a total duration of a set protocol period for communication between the terminal and a gateway is T, the total number of timeslots in the set protocol period is N, X is the number of timeslots between the current timeslot n and the latest idle timeslot, Pt is transmission power consumption generated when the terminal registers to the gateway for accessing the network, Pt=It×tt, where It is a transmission current, generally It≈3Ir, tt is a transmission time, and the network access power consumption P1 is:

$$P_1 \approx Ir \times \frac{T}{N} \times (X+1) + 3Ir \times tt = Ir \times \left[\frac{T}{N} \times (X+1) + 3tt\right].$$

If the transmission time tt of the terminal is far less than a duration T/N of a single timeslot, approximately, $$P_1 = Ir \times \frac{T}{N} \times (X+1)$$

When the method shown in FIG. 1 of the present disclosure is employed to enable the terminal to access the network, the terminal is in a receiving state only in the current timeslot n and the latest idle timeslot m (m≠n), and is in a dormancy state in a total of (X−1) timeslots from a timeslot (n+1) to a timeslot (m−1). In this case, the network access power consumption of the terminal is:

$$P_2 = Ir \times \frac{T}{N} \times 2 + Is \times \frac{T}{N} \times (X-1) + Pt$$

If a transmission time tt of the terminal is far less than a duration T/N of a single timeslot, approximately, transmission power consumption Pt generated when the terminal registers to the gateway for accessing the network is approximately zero, and:

$$P_2 = Ir \times \frac{T}{N} \times 2 + Is \times \frac{T}{N} \times (X-1).$$

The method shown in FIG. 1 of the present disclosure is employed to enable the terminal to access the network, the solution in the prior art is employed to implement network access, and thus a relation of network access power consumption therebetween is:

$$\frac{P_2}{P_1} = \frac{2}{X+1} + \frac{X-1}{R(X+1)}$$

where R=Ir/Is.
For example, in the case of Ir≈20 mA, Is≈100 μ0, $$\frac{P_2}{P_1} = \frac{2}{X+1} + \frac{X-1}{200(X+1)} \approx \frac{2}{X+1}.$$

In comparison, the network access power consumption in embodiments of the present disclosure is less than that in the related art. Especially, the greater the X is, that is, the greater the distance between a next idle timeslot and the current timeslot is, the lower the network access power consumption of the terminal is. It can be seen that in the embodiment of the present disclosure, according to the received idle timeslot information sent by the gateway to be accessed in the current timeslot, the number of timeslots between the current timeslot and the latest idle timeslot is parsed, and then the dormancy duration may be determined according to the number of timeslots. The terminal is dormant until the latest idle timeslot according to the dormancy duration, and then sends the network access request to the gateway to be accessed, thereby reducing the network access power consumption of the terminal.

In some embodiments of the present disclosure, step S101 that idle timeslot information, sent by a gateway to be accessed in a current timeslot, of the gateway to be accessed is received, so as to receive the idle timeslot information may have the following two implementations.

Figure 2:
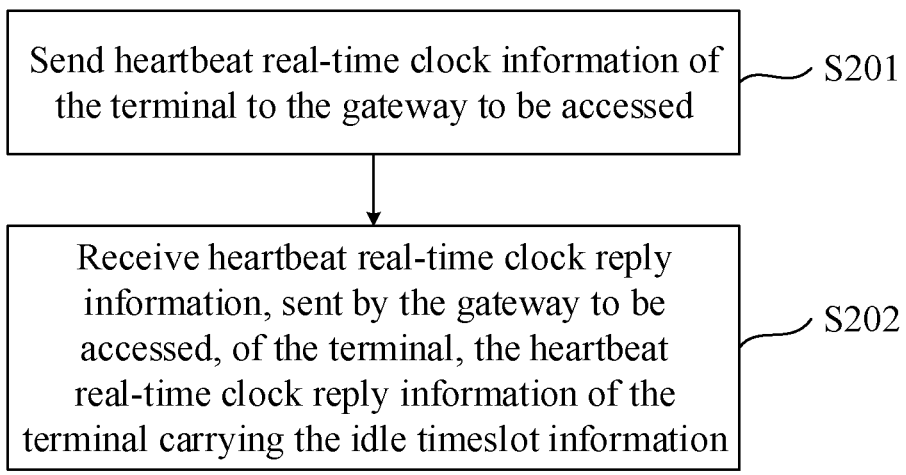
FIG. 2 is a flowchart of a method of a first implementation of step S101 in a method for a terminal to access a network provided in an embodiment of the present disclosure.

As shown in FIG. 2, a first implementation of step S101 includes:

S201: heartbeat real-time clock information of the terminal is sent to the gateway to be accessed; and S202: heartbeat real-time clock reply information, sent by the gateway to be accessed, of the terminal is received, the heartbeat real-time clock reply information of the terminal carrying the idle timeslot information.

In some embodiments, a specific implementation process of steps S201 to S202 is as follows.

Firstly, the terminal scans the gateway to be accessed and sends the heartbeat real-time clock information of the terminal to the gateway to be accessed, and the gateway to be accessed determines that the terminal accesses the network with the gateway by receiving the heartbeat real-time clock information from the terminal. Then the heartbeat real-time clock reply information, sent by the gateway to be accessed, of the terminal is received, the heartbeat real-time clock reply information of the terminal carrying the idle timeslot information, that is, the gateway to be accessed sends the heartbeat real-time clock reply information, carrying the idle timeslot information, of the terminal, to the terminal. In this way, after receiving the heartbeat real-time clock reply information, sent by the gateway to be accessed in the current timeslot, of the terminal, the terminal may determine the idle timeslot information from the heartbeat real-time clock reply information of the terminal, and find the latest idle timeslot of the gateway to be accessed in the shortest time according to the idle timeslot information, thereby reducing the network access power consumption. For example, if being occupied in the current timeslot, the gateway to be accessed sends the heartbeat real-time clock reply information, carrying the idle timeslot information, of the terminal to the terminal, and the terminal may find the latest idle timeslot of the gateway to be accessed in the shortest time, so that the terminal may be dormant from the current timeslot to a next idle timeslot, thereby reducing the network access power consumption of the terminal.

In some embodiments of the present disclosure, except for the idle timeslot information, the heartbeat real-time clock reply information of the terminal may further include a working timeslot calibration time, a current time, a working timeslot interval, and a terminal heartbeat interval, which is not limited herein.

In some embodiments of the present disclosure, a second implementation of step S101 includes:

broadcast information sent by the gateway to be accessed is received, the broadcast information carrying the idle timeslot information.

In some embodiments, the idle timeslot information is carried in the broadcast information sent by the gateway to be accessed to the terminal. In this way, the terminal may determine the idle timeslot information from the broadcast information after receiving the broadcast information sent by the gateway to be accessed, and the terminal may find the latest idle timeslot of the gateway to be accessed in the shortest time according to the idle timeslot information, thereby reducing the network access power consumption. For example, if not being occupied in the current timeslot, the gateway to be accessed sends the broadcast information carrying the idle timeslot information to the terminal, and the terminal may find the latest idle timeslot of the gateway to be accessed in the shortest time, so that the terminal may be dormant from the current timeslot to a next idle timeslot, thereby reducing the network access power consumption of the terminal.

In some embodiments of the present disclosure, except for the idle timeslot information, the broadcast information may further include a current time, a working timeslot interval, and a terminal heartbeat interval, which is not limited herein.

In some embodiments, except for the two implementations described above to receive the idle timeslot information in step S101, the idle timeslot information may also be carried in both the broadcast information and the heartbeat real-time clock reply information of the terminal. Certainly, the terminal may also receive the idle timeslot information according to actual application requirements, which is not limited herein.

In some embodiments of the present disclosure, step S103 that a dormancy duration of the terminal is determined according to the number of timeslots includes:

the dormancy duration of the terminal is determined according to a relational expression $t=T (X-1)/N$, where t represents the dormancy duration of the terminal, T represents a total duration of a set protocol period between the terminal and the gateway to be accessed, N represents the total number of timeslots in the set protocol period, and X represents the number of timeslots between the current timeslot and the latest idle timeslot.

In some embodiments of the present disclosure, in the case of knowing the total duration of the set protocol period between the terminal and the gateway to be accessed, the total number of timeslots in the set protocol period, and the number of timeslots between the current timeslot and the latest idle timeslot, the dormancy duration of the terminal may be determined. In this way, the terminal may be dormant for the dormancy duration from the current timeslot to the next idle timeslot, thereby reducing the network access power consumption of the terminal.

Figure 3:
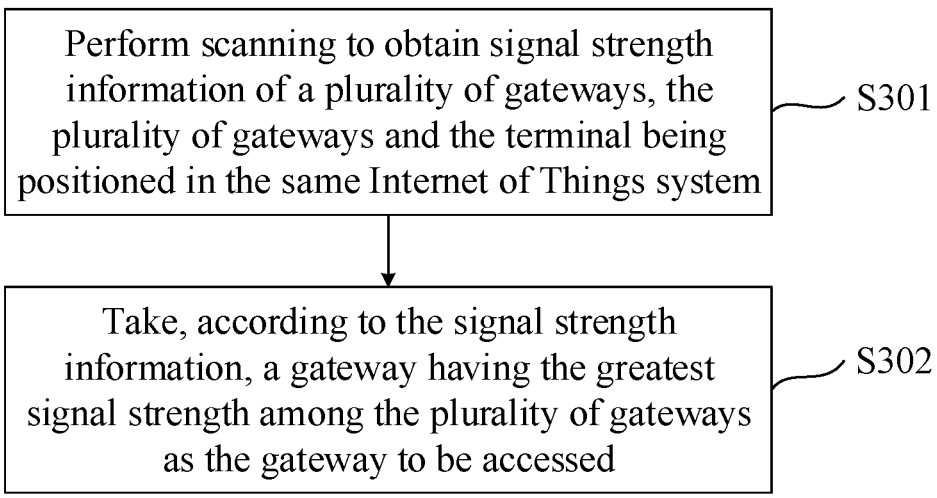
FIG. 3 is a flowchart of a method before step S101 in a method for a terminal to access a network provided in an embodiment of the present disclosure.

In some embodiments of the present disclosure, as shown in FIG. 3, before step S101 that idle timeslot information, sent by a gateway to be accessed in a current timeslot, of the gateway to be accessed is received, the method further includes:

S301: signal strength information of a plurality of gateways is obtained through scanning, the plurality of gateways and the terminal being positioned in the same Internet of Things system; and S302: a gateway having the greatest signal strength among the plurality of gateways is taken as the gateway to be accessed according to the signal strength information.

In some embodiments, a specific implementation process of steps S301 to S302 is as follows.

Firstly, signal strength information of the plurality of gateways positioned in the same Internet of Things system with the terminal is obtained through scanning. For example, the terminal scans information frames sent by the plurality of gateways in the same Internet of Things system, and parses an identity (ID) address of each gateway and a received signal strength indicator (RSSI) from the corresponding information frame. Then the gateway having the greatest signal strength among the plurality of gateways is taken as the gateway to be accessed according to the signal strength information. Since the gateway to be accessed is the gateway having the greatest signal strength among the plurality of gateways, when the terminal accesses to the network with the gateway to be accessed, a network access quality of the terminal may be effectively ensured, and a terminal use experience of a user may be improved.

In some embodiments of the present disclosure, step S104 that a network access request is sent to the gateway to be accessed after the terminal is dormant until the latest idle timeslot according to the dormancy duration includes: broadcast information from the gateway to be accessed is monitored in the latest idle timeslot and the network is accessed.

In some embodiments, after the gateway to be accessed is determined, the terminal may receive the idle timeslot information sent by the gateway to be accessed, and then parse the number of timeslots between the current timeslot and the latest idle timeslot in the gateway to be accessed from the idle timeslot information, that is, parse the number of timeslots between the next idle timeslot and the current timeslot in the gateway to be accessed. The terminal is dormant until the next idle timeslot, and monitors the broadcast information of the gateway to be accessed in the next idle timeslot, to access the network, thereby reducing the network access power consumption of the terminal.

In some embodiments, if no data are monitored by the terminal in the current timeslot, the current timeslot is an idle timeslot. In this case, the terminal may send the network access request to the gateway to be accessed in the current timeslot, so as to access the network.

In some embodiments of the present disclosure, the method further includes:

in response to determining that the gateway to be accessed has no idle timeslot in the set protocol period with the terminal, a gateway to be accessed is selected from other gateways having idle timeslots among the plurality of gateways excluding the gateway to be accessed after one timeslot duration.

In some embodiments, after the gateway having the greatest signal strength is determined as the gateway to be accessed, in response to determining that the gateway to be accessed has no idle timeslot in the set protocol period with the terminal, after one timeslot duration, a gateway to be accessed is selected from other gateways having idle timeslots among the plurality of gateways excluding the gateway to be accessed of the same Internet of Things system. For example, the gateway having the greatest signal strength has no idle timeslot, a gateway having signal strength next to the greatest signal strength may be determined from the plurality of gateways, and when having an idle timeslot, the gateway may be taken as the gateway to be accessed. Certainly, a person skilled in the art may select the gateway to be accessed according to actual application requirements, which will not be described in detail herein.

In some embodiments, in response to determining that the gateway to be accessed has no idle timeslot in the set protocol period with the terminal, in the related art, network access power consumption of the terminal is $P_1=Ir\times T$, while when the method shown in FIG. 1 of the present disclosure is employed to access the network, network access power consumption of the terminal is $$P_2 = Ir \times \frac{T}{N}.$$

Figure 4:
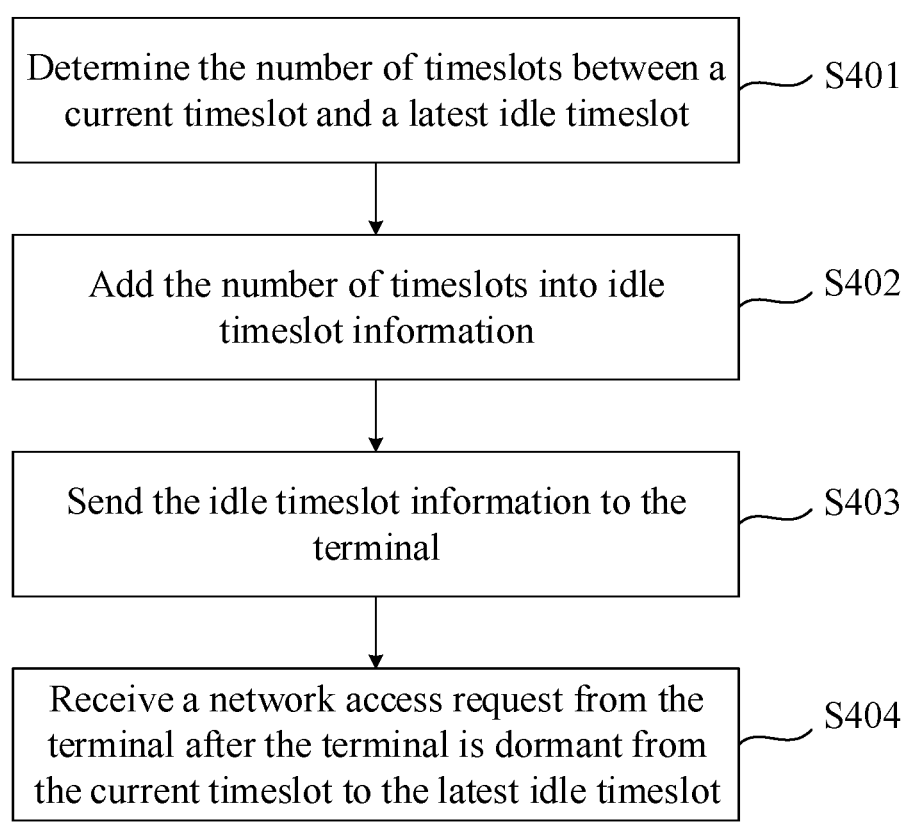
FIG. 4 is a flowchart of a method for a terminal to access a network provided in an embodiment of the present disclosure.

Based on the same disclosure concept, as shown in FIG. 4, further provided in an embodiment of the present disclosure is a method for a terminal to access a network. The method is applied to a gateway and includes:

S401: the number of timeslots between a current timeslot and a latest idle timeslot is determined;

S402: the number of timeslots is added into idle timeslot information;

S403: the idle timeslot information is sent to the terminal; and

S404: a network access request from the terminal is received after the terminal is dormant from the current timeslot to the latest idle timeslot.

In some embodiments, a specific implementation process of steps S401 to S404 is as follows:

Firstly, the gateway determines the number of timeslots between the current timeslot and the latest idle timeslot, where the gateway may be a gateway to be accessed for the terminal to access to the network, that is, the gateway to be accessed determines the number of timeslots between a next idle timeslot and the current timeslot. Then the number of timeslots is added into idle timeslot information. The idle timeslot information may be carried by heartbeat real-time clock information sent by the gateway to be accessed to the terminal, or by broadcast information sent by the gateway to be accessed to the terminal, which is not limited herein. Then the idle timeslot information is sent to the terminal. For example, the gateway to be accessed may send the idle timeslot information to the terminal through the heartbeat real-time clock information, carrying the idle timeslot information, of the terminal, or through the broadcast information. Finally, after the terminal is dormant from the current timeslot to the latest idle timeslot, the network access request from the terminal is received, so that the terminal monitors the broadcast information in the latest idle timeslot, to access the network, thereby reducing the network access power consumption of the terminal.

Figure 5:
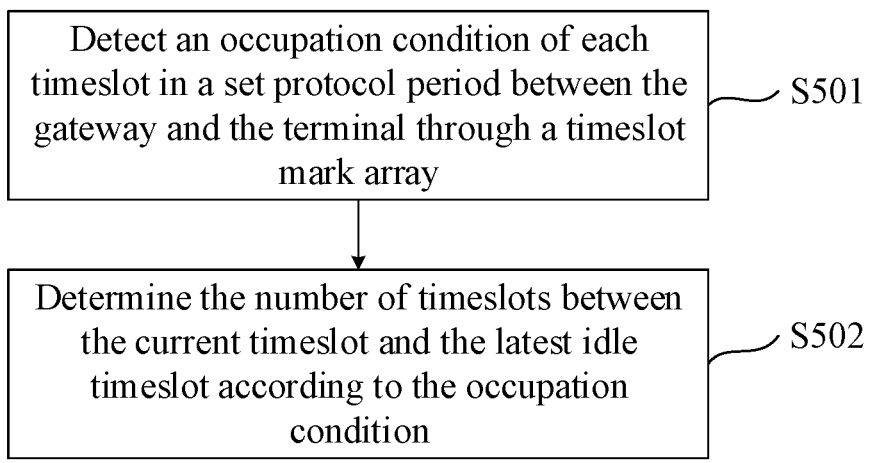
FIG. 5 is a flowchart of a method of step S401 in a method for a terminal to access a network provided in an embodiment of the present disclosure.

In some embodiments of the present disclosure, as shown in FIG. 5, step S401 that the number of timeslots between a current timeslot and a latest idle timeslot is determined includes:

S501: an occupation condition of each timeslot in a set protocol period between the gateway and the terminal is detected through a timeslot mark array; and S502: the number of timeslots between the current timeslot and the latest idle timeslot is determined according to the occupation condition.

In some embodiments, a specific implementation process of steps S501 to S502 is as follows:

Firstly, the occupation condition of each timeslot in the set protocol period between the gateway and the terminal is detected through the timeslot mark array. For example, in a set protocol period T, a timeslot mark array F_ts[N] includes N elements, and each element represents an occupation condition of a corresponding timeslot through "0" and "1" separately, where "0" may indicate that the timeslot is not occupied, and "1" may indicate that the timeslot is occupied. Then the number of timeslots between the current timeslot and the latest idle timeslot is determined according to the occupancy condition of each timeslot. For example, by identifying numerical values of the N elements in the timeslot mark array F_ts[N], the number of timeslots between the current timeslot and a next idle timeslot may be rapidly determined, thereby increasing a network access speed of the terminal.

In some embodiments of the present disclosure, step S502 that the number of timeslots between the current timeslot and the latest idle timeslot is determined according to the occupation condition may have, but is not limited to, three determination manners.

In some embodiments of the present disclosure, a first determination manner of step S502 includes:

a difference between the latest idle timeslot and the current timeslot is determined as the number of timeslots in response to determining that in the set protocol period, the current timeslot is occupied and the latest idle timeslot is positioned after the current timeslot.

Figure 6:
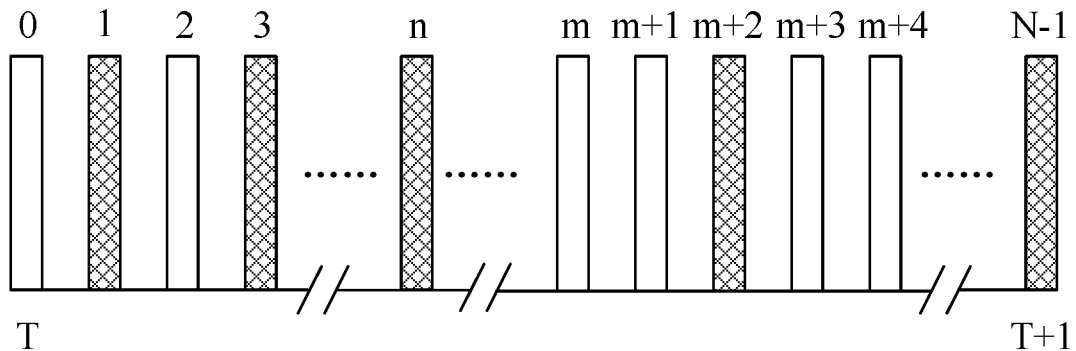
FIG. 6 is a schematic diagram of timeslot distribution, in a set protocol period, of a gateway to be accessed in a method for a terminal to access a network provided in an embodiment of the present disclosure.

In some embodiments, FIG. 6 is a schematic diagram of timeslot distribution, in a set protocol period, of a gateway to be accessed. Specifically, numbers corresponding to all timeslots in the set protocol period [T, T+1] are 0, 1, 2, ..., n, ..., m, m+1, m+2, m+3, ..., N−1, the total number of timeslots being N, and N being an integer greater than 1. FIG. 6. shows a timeslot mark array F_ts[N]=[0, 1, 0, 1, ..., 1, ..., 1, 0, 0, 0, ..., 1] corresponding to the set protocol period, where an element "0" in the timeslot mark array represents an idle timeslot, and "1" represents that a timeslot is occupied. If the current timeslot is numbered as n, and an idle timeslot closest to timeslot n is positioned after timeslot n, the number of timeslots between the current timeslot and the latest idle timeslot may be calculated as follows: elements corresponding to the corresponding timeslots in the timeslot mark array F_ts[n], F_ts[n+1], ..., F_ts[m−1], F_ts[m], ..., F_ts[N−1] are queried in sequence from timeslot n until the element "0" is queried. The timeslot corresponding to the element "0" is taken as the idle timeslot closest to the current timeslot. For example, Upon query, the latest idle timeslot is timeslot m positioned after timeslot n, and the number of timeslots between timeslot m and timeslot n is X=m−n.

In some embodiments of the present disclosure, a second determination manner of step S502 includes:

the sum of a difference between the latest idle timeslot and the current timeslot and a total number of timeslots in a timeslot period is determined as the number of timeslots in response to determining that in the set protocol period, the current timeslot is occupied and the latest idle timeslot is positioned before a timeslot, corresponding to the current timeslot, in a next set protocol period.

Figure 7:
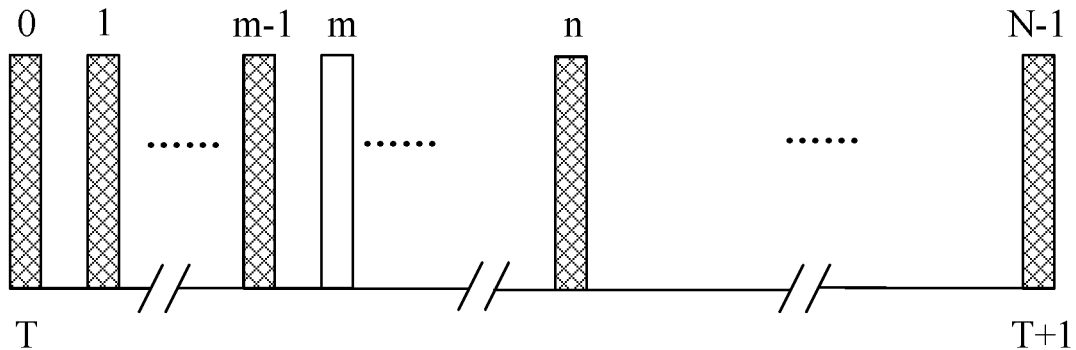
FIG. 7 is a schematic diagram of timeslot distribution, in a set protocol period, of a gateway to be accessed in a method for a terminal to access a network provided in an embodiment of the present disclosure.

In some embodiments, FIG. 7 is a schematic diagram of timeslot distribution, in a set protocol period, of a gateway to be accessed. Specifically, numbers corresponding to all timeslots in the set protocol period [T, T+1] are 0, 1, ..., m−1, m, ..., n, ..., N−1, the total number of timeslots being N, and N being an integer greater than 1. FIG. 7. shows a timeslot mark array F_ts[N]=[1, 1, ..., 1, 0, ..., 1, ..., 1] corresponding to the set protocol period, where an element "0" in the timeslot mark array represents an idle timeslot, and "1" represents that a timeslot is occupied. If the current timeslot is numbered as n, and an idle timeslot closest to timeslot n is positioned after timeslot n, the number of timeslots between the current timeslot and the latest idle timeslot may be calculated as follows: elements corresponding to the corresponding timeslots in the timeslot mark array, for example, $F\_ts[n]$, $F\_ts[n+1]$, ..., $F\_ts[N-1]$ are queried in sequence from timeslot n. Upon query, no idle timeslot is found. In this case, query is required to be restarted from a timeslot numbered as 0. If an element corresponding to $F\_ts[m]$ queried for the first time is "0", query is ended, and a timeslot corresponding to $F\_ts[m]$ is the idle timeslot closest to current timeslot n, and the number of timeslots between timeslot m and timeslot n is $X=(N-1)-n+m$, $m<n$.

In some embodiments of the present disclosure, a third determination manner of step S502 includes:

the number of timeslots is determined as zero in response to determining that in the set protocol period, the current timeslot is an idle timeslot, which indicates that the latest idle timeslot is the current timeslot.

In some embodiments, in the set protocol period, the current timeslot is the idle timeslot upon querying the elements in the timeslot mark array, and the latest idle timeslot is the current timeslot. In this case, the gateway may directly receive the network access request from the terminal in the current timeslot, so as to enable the terminal to access the network rapidly, thereby reducing the network access power consumption.

In some embodiments of the present disclosure, if in the set protocol period, timeslots corresponding to all the elements are all occupied upon querying all the elements in the timeslot mark array, for example, $F\_ts[N]=[1, 1, 1, \ldots, 1, 1, \ldots, 1, \ldots, 1]$. In this case, a maximum number of terminal data are carried by the gateway, and no terminal is allowed to access the network. In practical applications, the number of timeslots between the current timeslot and the idle timeslot closest thereto in this case may be set to any integer greater than N, for example, 0xFF. For example, if the number of timeslots calculated through the gateway is 0xFF, it indicates that all the timeslots in the gateway are occupied, and the terminal is required to access the network through another gateway. In the entire network access process, the gateway sends information carrying the idle timeslot information in each timeslot of a normal running stage of a set protocol, so that even when all the timeslots in the gateway are occupied, the terminal may determine to access the network through another gateway, instead of waiting for this gateway after one timeslot duration. The network access power consumption of the terminal is lower compared with that in the related art, the terminal determines to access the network through another gateway only after one set protocol period.

Figure 8:
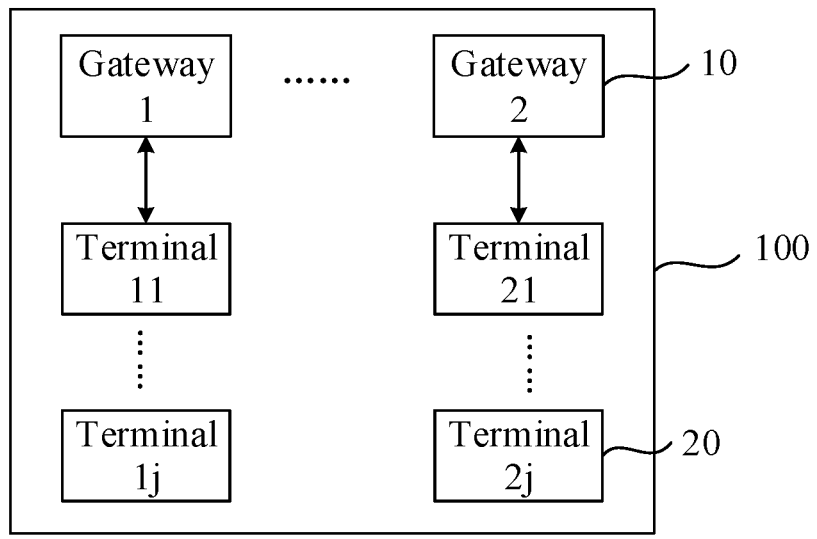
FIG. 8 is a schematic structural diagram of an Internet of Things system provided in an embodiment of the present disclosure.

Based on the same disclosure concept, as shown in FIG. 8, further provided in an embodiment of the present disclosure is an Internet of Things system 100. The Internet of Things system 100 includes a plurality of gateways 10 and a plurality of terminals 20 in communication connection with each gateway 10 through a set protocol. Each terminal 20 is configured for determining a gateway to be accessed from the plurality of gateways 10. The gateway to be accessed is configured for determining the number of timeslots between a current timeslot and a latest idle timeslot, and sending idle timeslot information including the number of timeslots to each in the Internet of Things system. The terminal is further configured for determining a dormancy duration according to the number of timeslots, and sending a network access request to the gateway to be accessed after being dormant until the latest idle timeslot according to the dormancy duration. FIG. 8 merely illustrates the gateways and the terminals in the Internet of Things system 100 in part. For example, terminals managed by gateway 1 include terminal 1*l*, ..., and terminal 1*j*, and terminals managed by gateway 2 include terminal 2*l*, ..., and terminal 2*j*, j being an integer greater than 1. In some embodiments, the number of gateways and the number of terminals in the Internet of Things system 100 may be set according to actual application requirements, which is not limited herein.

In some embodiments, the gateway 10 communicates with the terminal 20 through the set protocol. The set protocol may be a protocol corresponding to a frequency shift keying (FSK) mode of SX1278 in a wireless local area network. The terminal may be an electronic ink screen bedside card, an electronic ink screen doorplate card, an electronic ink screen badge, etc.

In some embodiments, the gateway to be accessed is configured for receiving, after the terminal 20 is dormant from the current timeslot to the latest idle timeslot, a network access request from the terminal 20.

In some embodiments, the terminal 20 is configured for monitoring broadcast information from the gateway to be accessed in the latest idle timeslot and accessing the network.

Figure 9:
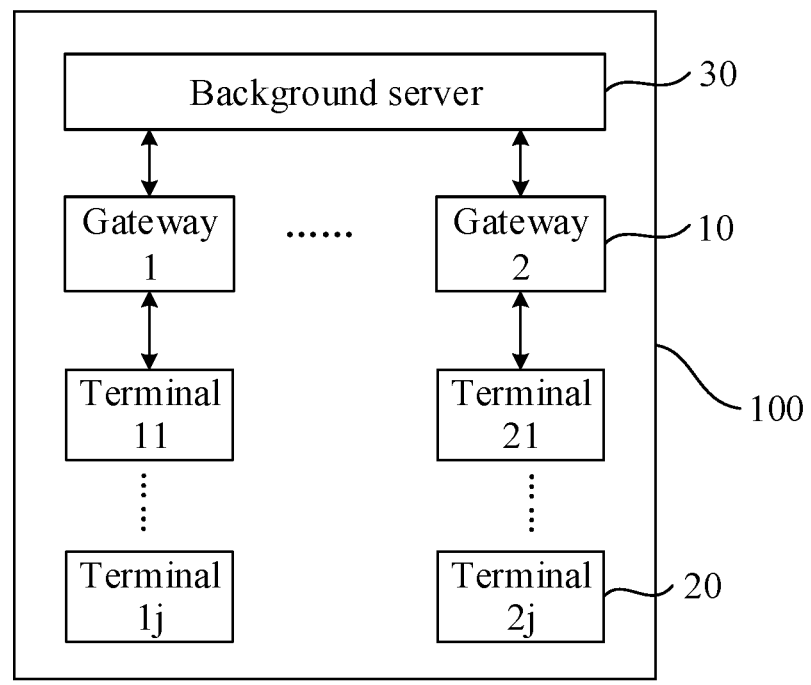
FIG. 9 is another schematic structural diagram of an Internet of Things system provided in an embodiment of the present disclosure.

FIG. 9 is another schematic structural diagram of an Internet of Things system 100. Specifically, the Internet of Things system 100 further includes a background server 30. The background server 30 is configured for managing and maintaining data, including issuing base maps, upgraded files, and texts, managing the gateway, etc. The background server 30 may also provide an operation interface for the user, and the user may send the data to the terminal and display alarm information from the terminal through the operation interface. The gateway is a transfer station connecting the background server and the terminal, and the gateway may complete information interaction with the badge terminal through the wireless local area network, or complete information interaction with the background server through a wired or wireless Ethernet. In some embodiments, the gateway will manage the accessed terminal. Information that the gateway may send to the terminal includes the broadcast information, heartbeat real-time clock reply information, issued data, issued instructions, etc. The terminal may perform functions such as positioning, information interaction, information display, and network access.

Figure 10:
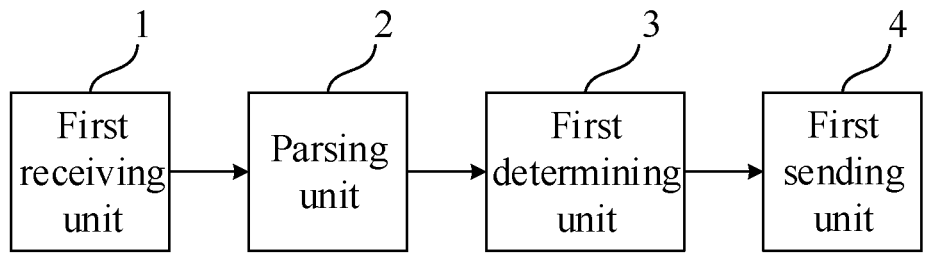
FIG. 10 is a schematic structural diagram of an apparatus for a terminal to access a network provided in an embodiment of the present disclosure.

Based on the same disclosure concept, as shown in FIG. 10, further provided in an embodiment of the present disclosure is an apparatus for a terminal to access a network. The apparatus is applied to a terminal and includes:

a first receiving unit 1 configured to receive idle timeslot information, sent by a gateway to be accessed in a current timeslot, of the gateway to be accessed;

a parsing unit 2 configured to parse the number of timeslots between the current timeslot and a latest idle timeslot from the idle timeslot information;

a first determining unit 3 configured to determine a dormancy duration of the terminal according to the number of timeslots; and a first sending unit 4 configured to send a network access request to the gateway after the terminal is dormant until the latest idle timeslot according to the dormancy duration.

In some embodiments of the present disclosure, the first receiving unit 1 is configured to:
sending a heartbeat real-time clock information of the terminal to the gateway to be accessed; and
receive a heartbeat real-time clock reply information, sent by the gateway to be accessed, of the terminal, the heartbeat real-time clock reply information of the terminal carrying the idle timeslot information.

In some embodiments of the present disclosure, the first receiving unit 1 is configured to:
receive a broadcast information sent by the gateway to be accessed, the broadcast information carrying the idle timeslot information.

In some embodiments of the present disclosure, the first determining unit 3 is configured to:
determine the dormancy duration of the terminal according to a relational expression $t=T(X-1)/N$;
where t represents the dormancy duration of the terminal, T represents a total duration of a set protocol period between the terminal and the gateway to be accessed, N represents the total number of timeslots in the set protocol period, and X represents the number of timeslots between the current timeslot and the latest idle timeslot.

In some embodiments of the present disclosure, the apparatus further includes a scanning unit configured to, before the first receiving unit 1 receives the idle timeslot information, sent by the gateway to be accessed in the current timeslot, of the gateway to be accessed:
perform scanning to obtain signal strength information of a plurality of gateways, the plurality of gateways and the terminal being positioned in the same Internet of Things system; and
take, according to the signal strength information, a gateway having the greatest signal strength among the plurality of gateways as the gateway to be accessed.

In some embodiments of the present disclosure, the first sending unit 4 is configured to:
monitor the broadcast information from the gateway to be accessed in the latest idle timeslot and accessing the network.

Figure 11:
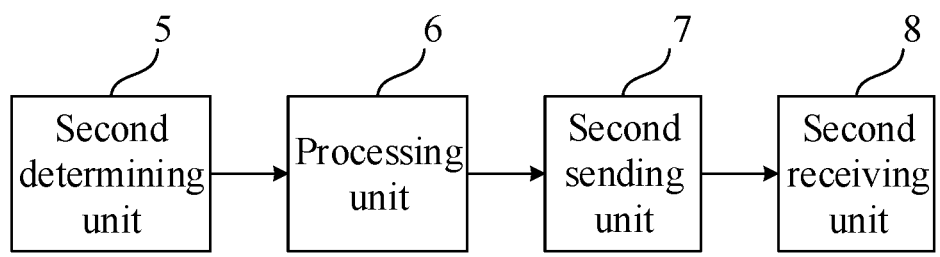
FIG. 11 is a schematic structural diagram of an apparatus for a terminal to access a network provided in an embodiment of the present disclosure.

Based on the same disclosure concept, as shown in FIG. 11, further provided in an embodiment of the present disclosure is an apparatus for a terminal to access a network. The apparatus is applied to a gateway and includes:
a second determining unit 5 configured to determine the number of timeslots between a current timeslot and a latest idle timeslot;
a processing unit 6 configured to add the number of timeslots into idle timeslot information;
a second sending unit 7 configured to send the idle timeslot information to the terminal; and
a second receiving unit 8 configured to receive a network access request from the terminal after the terminal is dormant from the current timeslot to the latest idle timeslot.

In some embodiments of the present disclosure, the second determining unit 5 is configured to:
detect an occupation condition of each timeslot in a set protocol period between the gateway and the terminal through a timeslot mark array; and
determine the number of timeslots between the current timeslot and the latest idle timeslot according to the occupation condition.

In some embodiments of the present disclosure, the second determining unit 5 is configured to:
determine a difference between the latest idle timeslot and the current timeslot as the number of timeslots in response to determining that in the set protocol period, the current timeslot is occupied and the latest idle timeslot is positioned after the current timeslot.

In some embodiments of the present disclosure, the second determining unit 5 is configured to:
determine the number of timeslots as zero in response to determining that in the set protocol period, the current timeslot is an idle timeslot, which indicates that the latest idle timeslot is the current timeslot.

Figure 12:
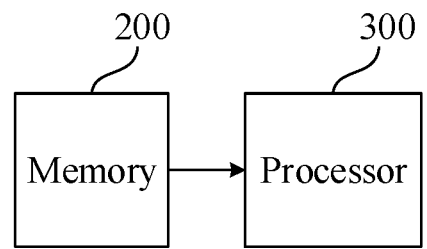
FIG. 12 is a schematic structural diagram of an apparatus for a terminal to access a network provided in an embodiment of the present disclosure.

Based on the same disclosure concept, as shown in FIG. 12, further provided in an embodiment of the present disclosure is an apparatus for a terminal to access a network. The apparatus includes:
a memory 200 and a processor 300; where
the memory 200 is configured to store a computer program; and
the processor 300 is configured to execute the computer program in the memory 200, which includes:
receiving idle timeslot information, sent by a gateway to be accessed in a current timeslot, of the gateway to be accessed;
parsing the number of timeslots between the current timeslot and a latest idle timeslot from the idle timeslot information;
determining a dormancy duration of the terminal according to the number of timeslots; and
sending a network access request to the gateway to be accessed after the terminal is dormant until the latest idle timeslot according to the dormancy duration.

Optionally, the processor 300 may be a central processing unit, an application specific integrated circuit (ASIC), or one or more integrated circuits for controlling execution of a program.

Optionally, the memory 200 may be a read only memory (ROM), a random access memory (RAM), or a disk memory. The memory 200 is configured for storing data required by the processor 300 during running, that is, storing computer programs executable by the processor 300. The processor 300 executes the method shown in FIG. 1 by executing the computer programs stored in the memory 200. There are one or more memories 200 and one or more processors 300.

A physical device corresponding to the first receiving unit 1, the parsing unit 2, the first determining unit 3, and the first sending unit 4 may be the aforementioned processor 300. The apparatus may be configured for executing the method provided in the embodiment shown in FIG. 1, which includes: receive the idle timeslot information, sent by the gateway to be accessed in the current timeslot, of the gateway to be accessed; parse the number of timeslots between the current timeslot and the latest idle timeslot from the idle timeslot information; determine the dormancy duration of the terminal according to the number of timeslots; and send the network access request to the gateway to be accessed after the terminal is dormant until the latest idle timeslot according to the dormancy duration. Therefore, for the functions that can be implemented by all functional modules in the apparatus, reference can be made to the corresponding description in the embodiment shown in FIG. 1, which will not be repeated herein.

Based on the same disclosure concept, further provided in an embodiment of the present disclosure is a computer program product, enabling a computer to execute the aforementioned method for a terminal to access a network when running on the computer.

While preferred embodiments of the present disclosure have been described, additional variations and modifications to these embodiments can be made by those skilled in the art once they know the basic inventive concepts. Therefore, the appended claims are intended to be interpreted as including the preferred embodiments and all variations and modifications falling within the scope of the present disclosure.

It will be apparent to those skilled in the art that various modifications and variations can be made to the present disclosure without departing from the spirit and scope of the present disclosure. Thus, it is intended that the present disclosure covers such modifications and variations that fall within the scope of the claims of the present disclosure and their equivalents.

What is claimed is:

1. A method for a terminal to access a network, applied to the terminal and comprising:
    receiving idle timeslot information, sent by a gateway to be accessed in a current timeslot, of the gateway to be accessed;
    parsing a quantity of timeslots between the current timeslot and a latest idle timeslot from the idle timeslot information;
    determining a dormancy duration of the terminal according to the quantity of timeslots; and
    sending a network access request to the gateway to be accessed after the terminal is dormant until the latest idle timeslot according to the dormancy duration;
    wherein the determining the dormancy duration of the terminal according to the quantity of timeslots comprises:
    determining the dormancy duration of the terminal according to a relational expression $t=T(X-1)/N$;
    wherein t represents the dormancy duration of the terminal, T represents a total duration of a set protocol period between the terminal and the gateway to be accessed, N represents a total quantity of timeslots in the set protocol period, and X represents the quantity of timeslots between the current timeslot and the latest idle timeslot.

2. The method according to claim 1, wherein the receiving the idle timeslot information, sent by the gateway to be accessed in the current timeslot, of the gateway to be accessed comprises:
    sending heartbeat real-time clock information of the terminal to the gateway to be accessed; and
    receiving heartbeat real-time clock reply information, sent by the gateway to be accessed, for the terminal, the heartbeat real-time clock reply information for the terminal carrying the idle timeslot information.

3. The method according to claim 1, wherein the receiving the idle timeslot information, sent by the gateway to be accessed in the current timeslot, of the gateway to be accessed comprises:
    receiving broadcast information sent by the gateway to be accessed, the broadcast information carrying the idle timeslot information.

4. The method according to claim 1, wherein before the receiving the idle timeslot information, sent by the gateway to be accessed in the current timeslot, of the gateway to be accessed, the method further comprises:
    performing scanning to obtain signal strength information of a plurality of gateways, the plurality of gateways and the terminal being positioned in a same Internet of Things system; and
    taking, a gateway having the greatest signal strength among the plurality of gateways as the gateway to be accessed according to the signal strength information.

5. The method according to claim 4, wherein the sending the network access request to the gateway to be accessed after the terminal is dormant until the latest idle timeslot according to the dormancy duration comprises:
    monitoring broadcast information from the gateway to be accessed in the latest idle timeslot and accessing the network.

6. The method according to claim 4, further comprising:
    in response to the gateway to be accessed having no idle timeslot in the set protocol period with the terminal, selecting a gateway from other gateways having idle timeslots among the plurality of gateways excluding the gateway to be accessed after one timeslot duration.

7. A method for a terminal to access a network, applied to a gateway and comprising:
    determining a quantity of timeslots between a current timeslot and a latest idle timeslot;
    adding the quantity of timeslots into idle timeslot information;
    sending the idle timeslot information to the terminal; and
    receiving a network access request from the terminal after the terminal is dormant from the current timeslot to the latest idle timeslot;
    wherein a dormancy duration of the terminal dormant from the current timeslot to the latest idle timeslot is determined according to a relational expression $t=T(X-1)/N$;
    wherein t represents the dormancy duration of the terminal, T represents a total duration of a set protocol period between the terminal and the gateway, N represents a total quantity of timeslots in the set protocol period, and X represents the quantity of timeslots between the current timeslot and the latest idle timeslot.

8. The method according to claim 7, wherein the determining the quantity of timeslots between the current timeslot and the latest idle timeslot comprises:
    detecting an occupation condition of each timeslot in the set protocol period between the gateway and the terminal through a timeslot mark array; and
    determining the quantity of timeslots between the current timeslot and the latest idle timeslot according to the occupation condition.

9. The method according to claim 8, wherein the determining the quantity of timeslots between the current timeslot and the latest idle timeslot according to the occupation condition comprises:
    determining a difference between the latest idle timeslot and the current timeslot as the quantity of timeslots in response to the current timeslot is occupied and the latest idle timeslot is positioned after the current timeslot in the set protocol period.

10. The method according to claim 8, wherein the determining the quantity of timeslots between the current timeslot and the latest idle timeslot according to the occupation condition comprises:
    determining a sum of a difference between the latest idle timeslot and the current timeslot and a difference between the total quantity of timeslots in the set protocol period and 1 as the quantity of timeslots in response to the current timeslot is occupied in the set protocol period and the latest idle timeslot is positioned before a timeslot, corresponding to the current timeslot, in a next set protocol period.

11. The method according to claim 8, wherein the determining the quantity of timeslots between the current timeslot and the latest idle timeslot according to the occupation condition comprises:

determining the quantity of timeslots as zero in response to the current timeslot is an idle timeslot in the set protocol period, which indicates that the latest idle timeslot is the current timeslot.

12. An Internet of Things system, comprising a plurality of gateways and a plurality of terminals in communication connection with each gateway through a set protocol;

wherein each terminal is configured to determine a gateway to be accessed from the plurality of gateways; the gateway to be accessed is configured to determine a quantity timeslots between a current timeslot and a latest idle timeslot, and send idle timeslot information comprising the quantity of timeslots to each terminal in the Internet of Things system; and the terminal is further configured to determine a dormancy duration according to the quantity of timeslots, and send a network access request to the gateway to be accessed after the terminal is dormant until the latest idle timeslot according to the dormancy duration;

wherein the dormancy duration is determined according to a relational expression $t=T(X-1)/N$;

wherein t represents the dormancy duration, T represents a total duration of a set protocol period between the terminal and the gateway to be accessed, N represents a total quantity of timeslots in the set protocol period, and X represents the quantity of timeslots between the current timeslot and the latest idle timeslot.

13. The Internet of Things system according to claim 12, wherein the gateway to be accessed is configured to receive the network access request from the terminal after the terminal is dormant from the current timeslot to the latest idle timeslot.

14. The Internet of Things system according to claim 12, wherein the terminal is configured to monitor broadcast information from the gateway to be accessed in the latest idle timeslot and access the network.

15. An apparatus for a terminal to access a network, applied to a terminal and comprising: a memory and a processor; wherein the memory is configured to store a computer program; and the processor is configured to execute the computer program in the memory to implement the method according to claim 1.

16. An apparatus for a terminal to access a network, applied to a gateway and comprising: a memory and a processor; wherein the memory is configured to store a computer program; and the processor is configured to execute the computer program in the memory to implement the method according to claim 7.

17. A non-transitory storage medium storing a computer program, wherein the computer program, when executed on a computer, causes the computer to implement the method according to claim 1.

18. A non-transitory storage medium storing a computer program, wherein the computer program, when executed on a computer, causes the computer to implement the method according to claim 7.

* * * * *